(12) United States Patent
Kim et al.

(10) Patent No.: US 11,461,704 B2
(45) Date of Patent: Oct. 4, 2022

(54) TWO-CLASS CLASSIFICATION METHOD FOR PREDICTING CLASS TO WHICH SPECIFIC ITEM BELONGS, AND COMPUTING DEVICE USING SAME

(71) Applicant: BIOINFRA LIFE SCIENCE INC., Seoul (KR)

(72) Inventors: Chul Woo Kim, Seoul (KR); Yong Dai Kim, Seoul (KR); Kyung Nam Kang, Seoul (KR); Oh Ran Kwon, Seoul (KR)

(73) Assignee: BIOINFRA LIFE SCIENCE INC., Seoul (KR)

( * ) Notice: Subject to any disclaimer, the term of this patent is extended or adjusted under 35 U.S.C. 154(b) by 819 days.

(21) Appl. No.: 16/348,455

(22) PCT Filed: Nov. 9, 2017

(86) PCT No.: PCT/KR2017/012690
§ 371 (c)(1),
(2) Date: May 8, 2019

(87) PCT Pub. No.: WO2018/088825
PCT Pub. Date: May 17, 2018

(65) Prior Publication Data
US 2019/0318266 A1    Oct. 17, 2019

(30) Foreign Application Priority Data
Nov. 9, 2016    (KR) .......................... 10-2016-0149120

(51) Int. Cl.
*G06N 20/20*    (2019.01)
*G06N 5/00*    (2006.01)
(Continued)

(52) U.S. Cl.
CPC ............. *G06N 20/20* (2019.01); *G06F 17/18* (2013.01); *G06K 9/6282* (2013.01); *H04L 7/00* (2013.01)

(58) Field of Classification Search
USPC .................................................. 382/133, 226
See application file for complete search history.

(56) References Cited

U.S. PATENT DOCUMENTS 5,930,392 A * 7/1999 Ho ....................... G06K 9/6228
                                              382/226
6,219,658 B1 * 4/2001 Gordon ................ G06K 9/6285
                                              706/15
(Continued)

FOREIGN PATENT DOCUMENTS

JP    2015-517653 A    6/2015
JP    2016-181255 A    10/2016
(Continued)

OTHER PUBLICATIONS

Search Report issued by the Korean Intellectual Property Office (KIPO) dated Jan. 31, 2018 for International Application PCT/KR2017/012690.

*Primary Examiner* — Ishrat I Sherali
(74) *Attorney, Agent, or Firm* — Holzer Patel Drennan

(57) ABSTRACT

A computing device of the present invention estimates an unknown parameter β of a model formula when distributed sample data is acquired, wherein when an estimated quantity of β is acquired, a function g is estimated using a random forest model, such that when an estimated quantity of g is acquired, the estimated quantity of g and the estimated quantity of β are used so as estimate a function G as a prediction formula for new data corresponding to a specific item such that an estimated quantity of G is acquired, and
(Continued)

thus new data $x_{new}$ is received, thereby enabling the class of the specific item to be classified from the calculated value.

18 Claims, 10 Drawing Sheets

(51) Int. Cl.
    *G06K 9/62*     (2022.01)
    *G06F 17/18*     (2006.01)
    *H04L 7/00*     (2006.01)

(56) References Cited

U.S. PATENT DOCUMENTS

| | | | | |
|---|---|---|---|---|
| 8,306,942 B2* | 11/2012 | Chen | | G06N 20/00 706/62 |
| 8,352,390 B2* | 1/2013 | Yuta | | G06K 9/628 706/13 |
| 8,515,681 B2* | 8/2013 | Sontrop | | G16B 25/10 702/19 |
| 8,744,172 B2* | 6/2014 | Tsymbal | | G06K 9/6282 382/224 |
| 9,474,490 B2* | 10/2016 | Kalkstein | | G01N 33/57419 |
| 2005/0171923 A1* | 8/2005 | Kiiveri | | G16B 40/20 |
| 2009/0281981 A1* | 11/2009 | Chen | | G06N 20/20 706/56 |
| 2009/0319244 A1* | 12/2009 | West | | G16B 40/00 703/11 |
| 2016/0283679 A1* | 9/2016 | Hu | | G06N 5/04 |

FOREIGN PATENT DOCUMENTS

| | | |
|---|---|---|
| KR | 10-2010-0082377 A | 7/2010 |
| KR | 10-2012-0075570 A | 7/2012 |
| KR | 20130004203 A | 1/2013 |
| WO | 2016096309 A1 | 6/2016 |

\* cited by examiner

TWO-CLASS CLASSIFICATION METHOD FOR PREDICTING CLASS TO WHICH SPECIFIC ITEM BELONGS, AND COMPUTING DEVICE USING SAME

FIELD OF THE DISCLOSURE

The present disclosure relates to a method for 2-class classification to estimate a specific class to which a specific item belongs; and more particularly, to the method for acquiring sample data which is independently and identically distributed, and via semi parametric logistic regression with random forests, (i) estimating an unknown parameter of a model equation, and (ii) estimating an estimating equation for new data by using a random forest model, to thereby estimate the specific class, and the computing device using the same.

BACKGROUND OF THE DISCLOSURE

Classification refers to a statistical process used to divide a collection of items, e.g., data samples, into homogeneous classes in terms of measurable properties or characteristics. Generally speaking, a typical classifier (e.g., a computerized system that performs classification, but often also a classification methodology itself) is trained to first recognize a key pattern in a set of available training samples, and to tag the key pattern. Herein, a term "training" refers to a procedure of repeated calculations to give an appropriate classification ability to the classifier. A once trained classifier will be used to predict which class incoming data will belong to.

One of the most significant recent advances in the classification is a random forest (RF) methodology, in which a concept of a random decision forest was first proposed by Tin Kam Ho of the Bell Laboratories in 1995, and expanded and formulated by Leo Breiman. As used herein, a "random forest", a "random forest methodology", and an "RF" refer to classification concept described by Leo Breiman and do not refer to software products of the same name. The random forest is a machine learning non-parametric ensemble approach that utilizes bagging to combine decisions of a plurality of classification trees that classify the data samples. In other words, the random forest is a way to create decision trees that are weakly related to each other, and then join them linearly to create a final learning device. The random forest is known to be highly predictive. The random forest also combines random extraction of independent variables along with bootstrapping to maximize randomness. This feature allows predictions of each tree to be decorrelated, resulting in improved generalization performance. The random extraction makes the forest robust even for noisy data. The random extraction is performed in a training process of each tree, and an ensemble learning, i.e., bagging, and randomized node optimization can be applied to the process. Both of these procedures can be used simultaneously to further enhance the randomness.

For reference, an algorithm of the random forest methodology is briefly described as pseudo code as follows.

(1) For b=1 to B;

(1-i) a bootstrap sample Z is generated using sample data for training (1-ii) decision trees (basic classifiers) are generated (trained) using the bootstrap sample Z, and only k randomly selected variables are used as independent variables (2) supposing that $T_b(x)$ are the decision trees generated as such, the generated decision trees are linearly combined as $(T_1(x)+T_2(x)+ \ldots +T_B(x))/B$ (if an averaging procedure is used)

A conventional classifying system to which a classic random forest (RF) methodology has been applied is disclosed, for example, in U.S. Pat. No. 5,930,392 which describes a method for classifying data using an initial random decision forest and a system using the same. Particularly, the U.S. Pat. No. 5,930,392 deals with automatic analysis of images and patterns, and accordingly, a technique for classifying images and patterns and recognizing images and patterns using them is described.

On the other hand, a logistic regression methodology has been used for a long time in predicting dependent variables having only two categories or two classes, and this is well known to those skilled in the art. The two categories herein are concepts corresponding to attributes that are exclusive to each other, such as "man" and "woman", "patient with a specific disease" and "non-patient", "legal" and "illegal", and such a methodology is widely used, for example, as a statistical model to determine whether or not a patient has a specific disease.

The inventors of the present disclosure have sought to combine the random forest methodology with the logistic regression methodology in a process of studying a method for improving prediction performance of the logistic regression methodology which has been used for a long time to predict dependent variables having only two categories. Although the logistic regression methodology and the random forest methodology have been known in the past, the logistic regression methodology is basically a parametric method, while the random forest methodology is a non-parametric method, so it has not been easy to combine the two.

Accordingly, the inventors of the present disclosure propose a two-class classification method capable of more accurate two-class classification by incorporating the random forest methodology into the logistic regression model in a manner not previously performed, and a computing device using the same.

SUMMARY OF THE DISCLOSURE

It is an object of the present disclosure to provide a two-class classification method more accurate than a conventional logistic regression analysis, and a computing device using the same.

It is another object of the present disclosure to provide a method for combining a logistic regression methodology with a random forest methodology which have not been used together due to difficulty in combining although they have high accuracy.

It is still another object of the present disclosure to provide the accurate two-class classification method despite required computational load.

It is still yet another object of the present disclosure to allow the method and the computing device of the present disclosure to be used in a real world for classification of various objects.

For example, it is still yet another object of the present disclosure to provide an accurate classification method if certain data can be classified into one of a patient with a specific disease and those of a non-patient.

In order to accomplish objects above, representative structures of the present disclosure are described as follows.

In accordance with one aspect of the present disclosure, there is provided a method for 2-class classification to estimate a specific class to which a specific item belongs, including steps of: (a) a computing device acquiring sample data $(Y_1, X_1), \ldots, (Y_n, X_n)$ which is independently and identically distributed, wherein n is the number of the sample data, $X_i=(1, X_{i1}, \ldots, X_{id})^T \in X \subset R^d$ is a d-dimensional vector, $Y_i$ has or is manipulated to have a value of $-1$ or 1, and $-1$ and 1 are set as respectively corresponding to two of classes; (b) the computing device, if the sample data is acquired, estimating or supporting another device to estimate an unknown parameter $\beta$ of a model equation $$G(x) = \mathbb{E}[\mathbb{P}(Y \mid X)] = \mathbb{P}(Y = 1 \mid X) = \frac{\exp\{2X^T\beta + 2g(X)\}}{1 + \exp\{2X^T\beta + 2g(X)\}}, \text{ and}$$

$$\frac{1}{2}\log\frac{\mathbb{P}(Y = 1 \mid X)}{\mathbb{P}(Y = -1 \mid X)} = X^T\beta + g(X),$$

wherein $\beta = (\beta_0, \beta_1, \ldots, \beta_d)$, X is an independent variable, Y is a dependent variable, and the function g takes a form of a random forest model; (c) the computing device, if an estimator $\hat{\beta}$ of the unknown parameter $\beta$ is acquired, estimating or supporting another device to estimate the function g by using the random forest model; and (d) the computing device, if an estimator $\hat{g}$ of the function g is acquired, estimating or supporting another device to estimate the function G as an estimating equation for new data corresponding to the specific item by using the estimator $\hat{\beta}$ of the unknown parameter $\beta$ and the estimator $\hat{g}$ of the function g, to thereby acquire an estimator $\hat{G}$ of the function G.

As one example, the method further comprises a step of: (e) the computing device, if the estimator $\hat{G}$ of the function G is acquired and new data $X_{new}$ is inputted, calculating a value of $\hat{G}(X_{new})$ and determining or supporting another device to determine the specific class of the specific item by referring to the value of the calculated $\hat{G}(X_{new})$.

In accordance with another aspect of the present disclosure, there is provided a computing device for 2-class classification to estimate a specific class to which a specific item belongs, including: a communication part for acquiring sample data $(Y_1, X_1), \ldots, (Y_n, X_n)$ which is independently and identically distributed, wherein n is the number of the sample data, $X_i=(1, X_{i1}, \ldots, X_{id})^T \in X \subset R^d$ is a d-dimensional vector, $Y_i$ has or is manipulated to have a value of $-1$ or 1, and $-1$ and 1 are set as respectively corresponding to two of classes; and a processor for, (i) if the sample data is acquired, estimating or supporting another device to estimate an unknown parameter $\beta$ of a model equation $$G(x) = \mathbb{E}[\mathbb{P}(Y \mid X)] = \mathbb{P}(Y = 1 \mid X) = \frac{\exp\{2X^T\beta + 2g(X)\}}{1 + \exp\{2X^T\beta + 2g(X)\}}, \text{ and}$$

$$\frac{1}{2}\log\frac{\mathbb{P}(Y = 1 \mid X)}{\mathbb{P}(Y = -1 \mid X)} = X^T\beta + g(X),$$

wherein $\beta = (\beta_0, \beta_1, \ldots, \beta_d)$, X is an independent variable, Y is a dependent variable, and the function g takes a form of a random forest model, (ii) if an estimator $\hat{\beta}$ of the unknown parameter $\beta$ is acquired, estimating or supporting another device to estimate the function g by using the random forest model, and (iii) if an estimator $\hat{g}$ of the function g is acquired, estimating or supporting another device to estimate the function G as an estimating equation for new data corresponding to the specific item by using the estimator $\hat{\beta}$ of the unknown parameter $\beta$ and the estimator $\hat{g}$ of the function g, to thereby acquire an estimator $\hat{G}$ of the function G.

As one example, the computing device further comprises a process of: (iv) if the estimator $\hat{G}$ of the function G is acquired and new data $X_{new}$ is inputted, calculating a value of $\hat{G}(X_{new})$ and determining or supporting another device to determine the specific class of the specific item by referring to the value of the calculated $\hat{G}(X_{new})$.

BRIEF DESCRIPTION OF THE DRAWINGS

The following drawings to be used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

Figure 1:
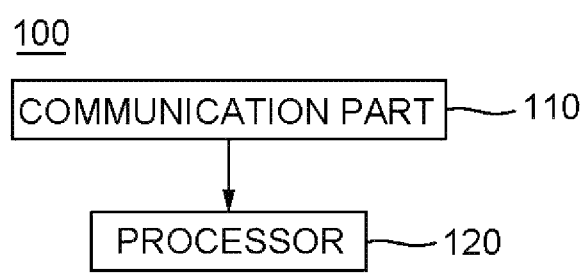
FIG. 1 is a conceptual diagram schematically illustrating an exemplary configuration of a computing device for providing a two-class classification method to estimate a specific class of a specific item in accordance with the present disclosure.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Throughout the present specification, a term "learning" or "training" is used to indicate a process of acquiring a statistical model by a certain procedure, but not a mental process like education of a human as is well understood by those skilled in the art.

Besides, in the detailed description and claims of the present disclosure, a term "include" and its variations are not intended to exclude other technical features, additions, components or steps. Other objects, benefits and features of the present disclosure will be revealed to those skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It should be noted that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Unless otherwise noted in this specification or clearly contradicted in the context, an item indicated in the singular includes those in the plural, unless otherwise required in the context. These embodiments will be described in sufficient detail by referring to attached drawings regarding the embodiments of the present disclosure to enable those skilled in the art to practice the disclosure.

Specifically, the computing device may typically achieve a desired system performance by using combinations of at least one computing device and at least one computer software, e.g., a computer processor, a memory, a storage, an input device, an output device, or a client computer and a server computer that may include any other conventional computing components, an electronic communication device such as electronic communication line, a router or a switch, an electronic information storage system such as a network-attached storage (NAS) device and a storage area network (SAN) as the computing device and any instructions that allow the computing device to function in a specific way as the computer software.

By referring to FIG. 1 illustrating the computing device 100 in accordance with the present disclosure, the computing device 100 may include a communication part 110 and a processor 120. The computing device 100 may acquire or support another device to acquire data in accordance with the present disclosure, and may process the data, to thereby provide users with a desired classifying function. As described below and well known to those skilled in the art, the method in accordance with the present disclosure is implemented by using computer hardware and software. For example, as software to implement statistical methods on the computer hardware, anything can be used capable of performing instructed calculation such as statistics software like R statistical package, SPSS, SAS, Mathematica, or any programming language capable of implementing such statistical methods.

For convenience of explanation on the method and the computing device of the present disclosure, the present specification will include examples using an R statistical package (R Development Core Team (2007); R: A language and environment for statistical computing; R Foundation for Statistical Computing, Vienna, Austria; ISBN 3-900051-07-0, URL http://www.R-project.org) for statistical analysis, however, those skilled in the art will understand that the methods of the present disclosure may be implemented by any computing devices using any software technology without being limited to a software platform like the R statistical package.

Figure 2:
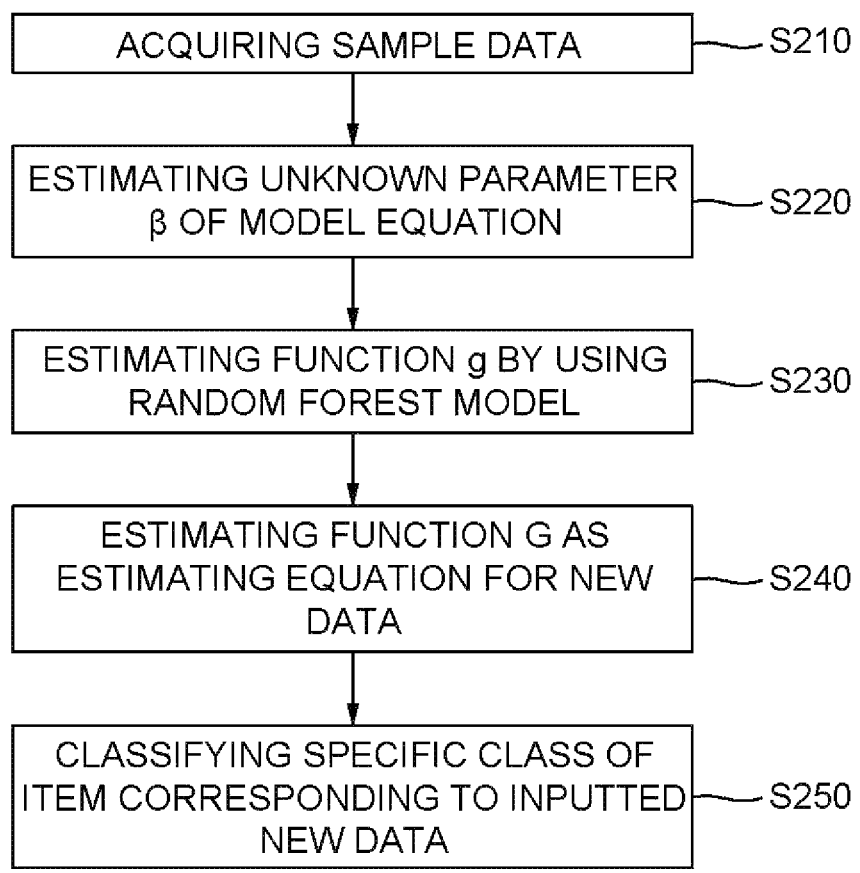
FIG. 2 is a flow chart schematically illustrating an exemplary method for providing the two-class classification method to estimate the specific class of the specific item in accordance with the present disclosure.
Figure 3A:
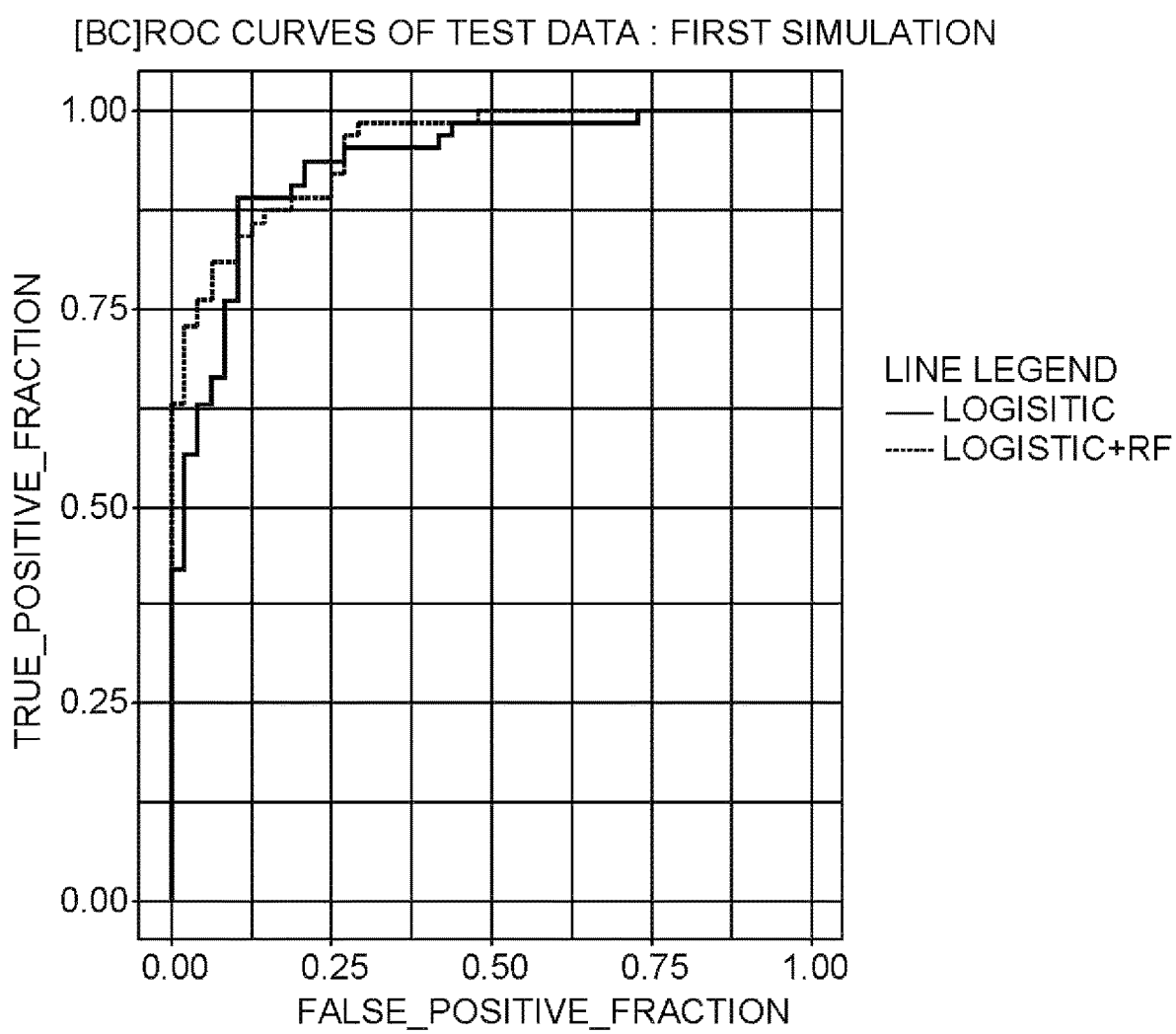
FIGS. 3A to 3D are drawings schematically illustrating Receiver Operating Characteristic (ROC) curves used for evaluating performance of a conventional logistic regression model and that of a model in the present disclosure when classifying a breast cancer patient and a non-patient.
Figure 3B:
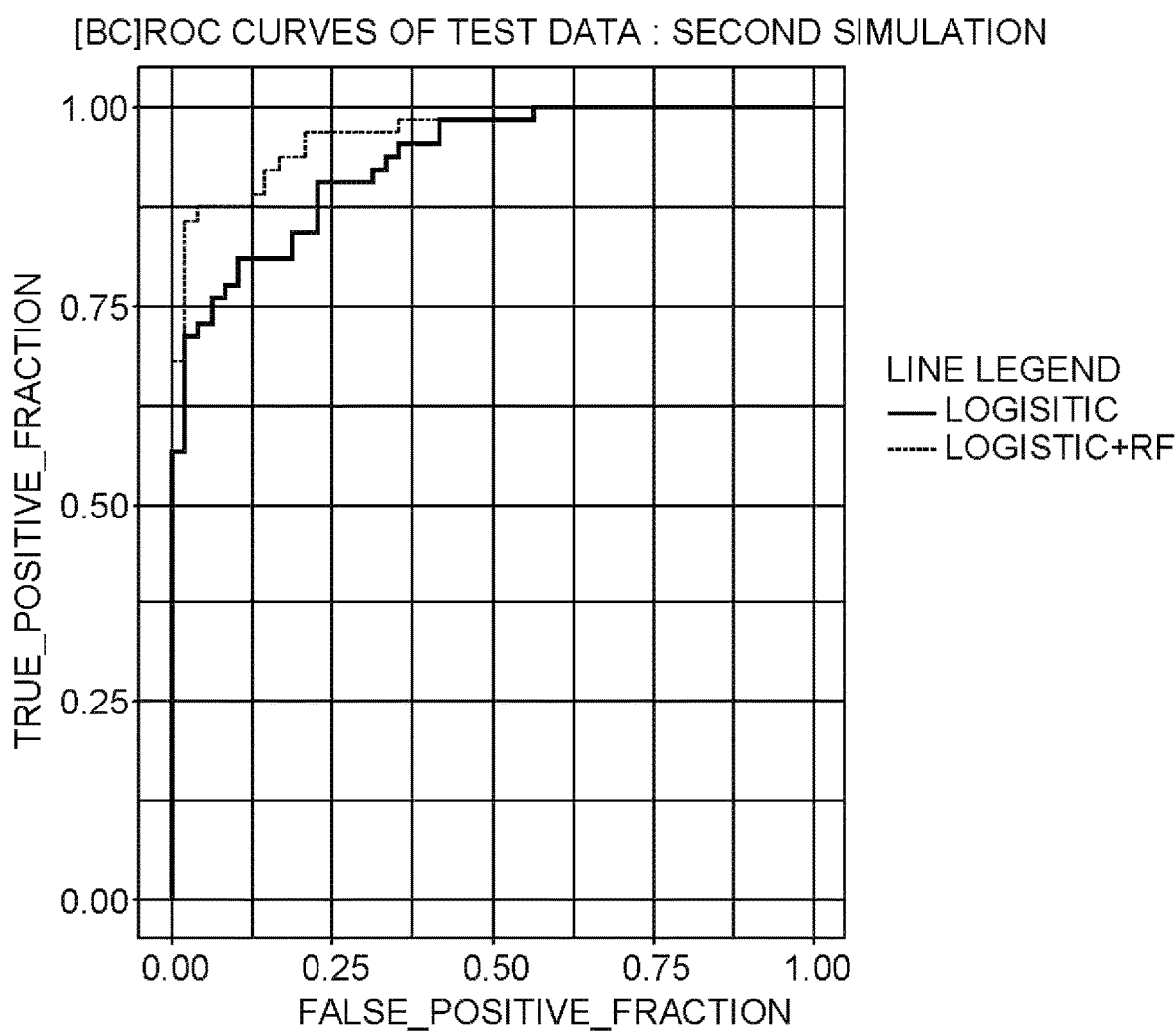
Figure 3C:
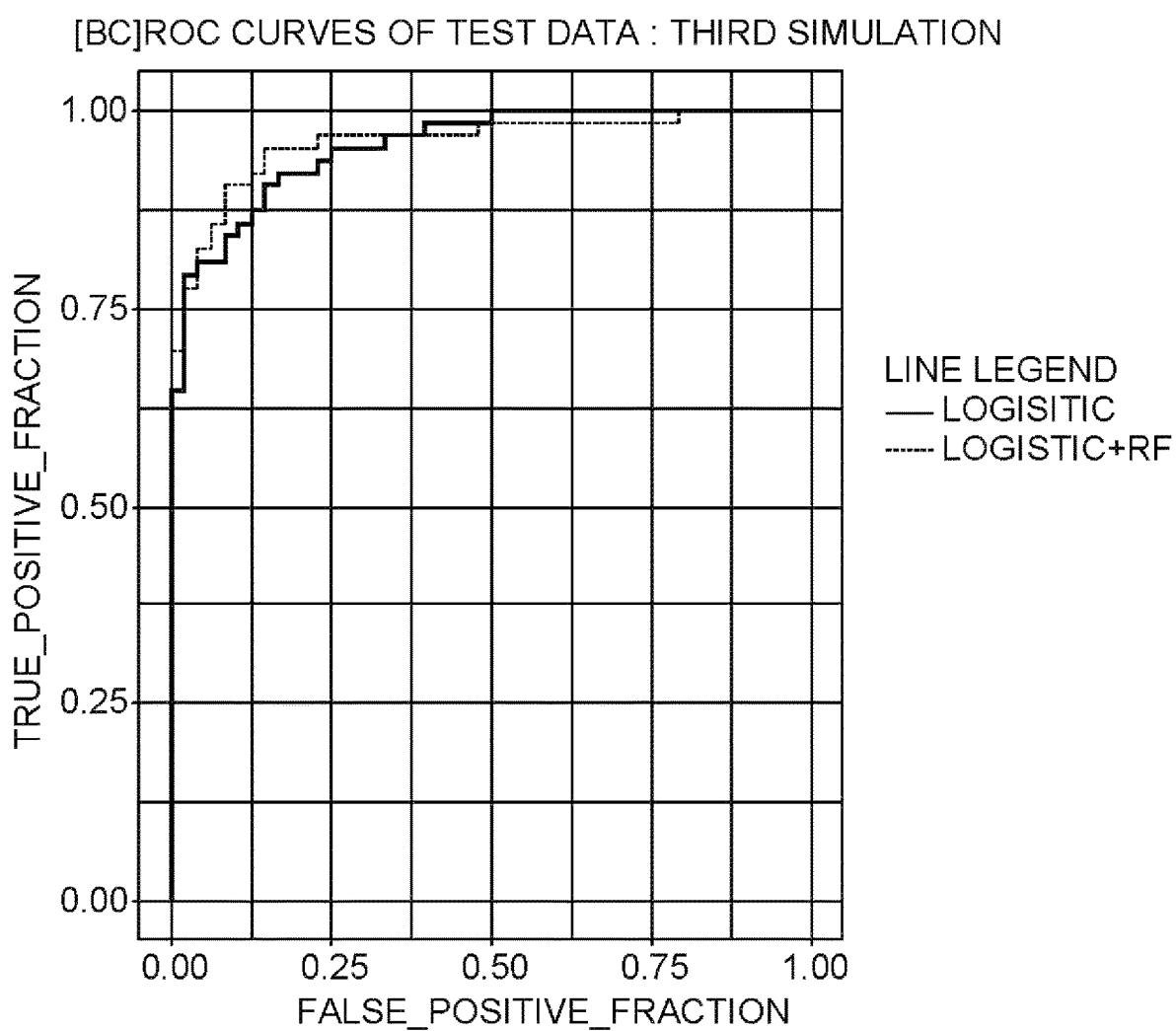
Figure 3D:
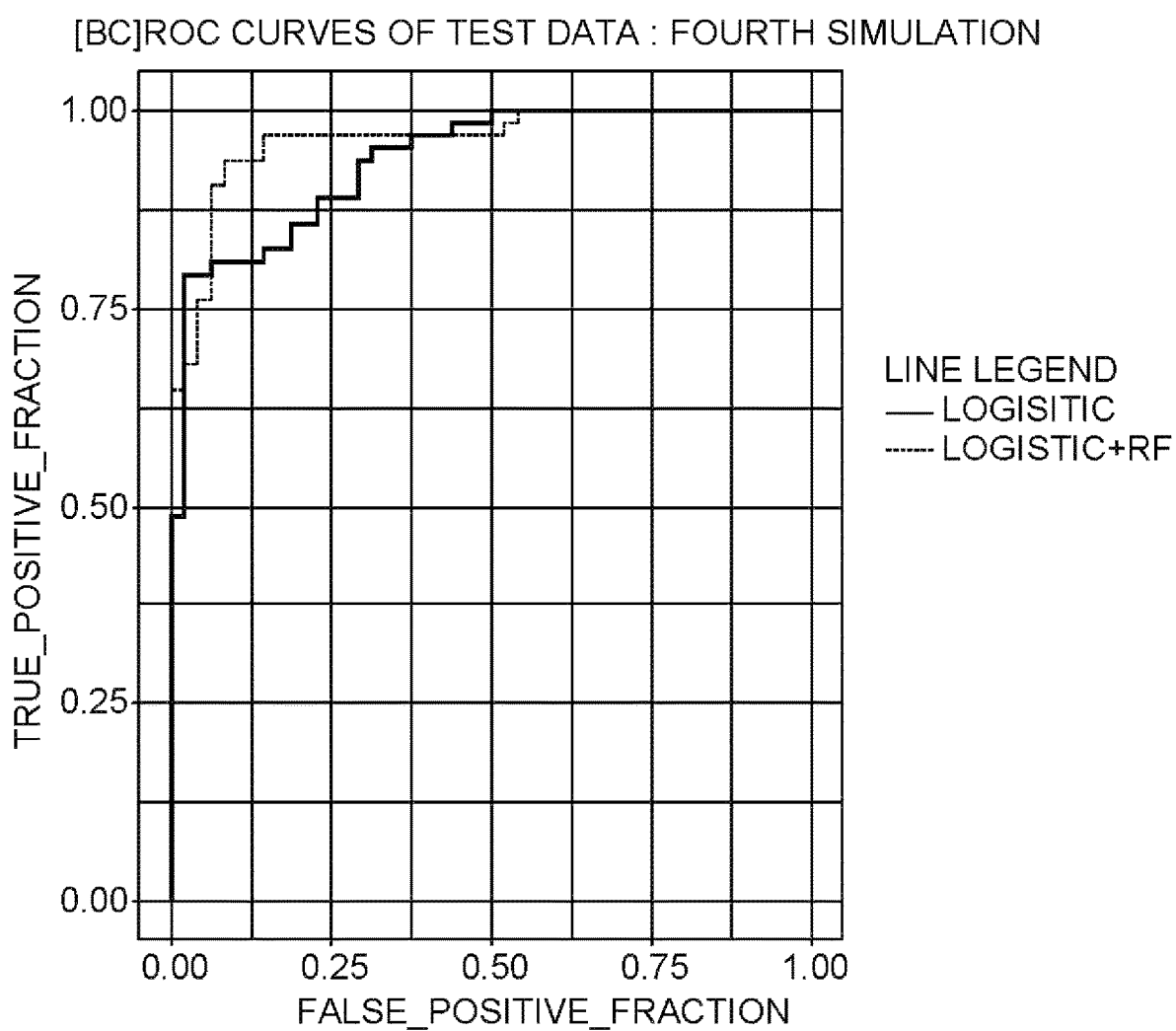
Figure 4A:
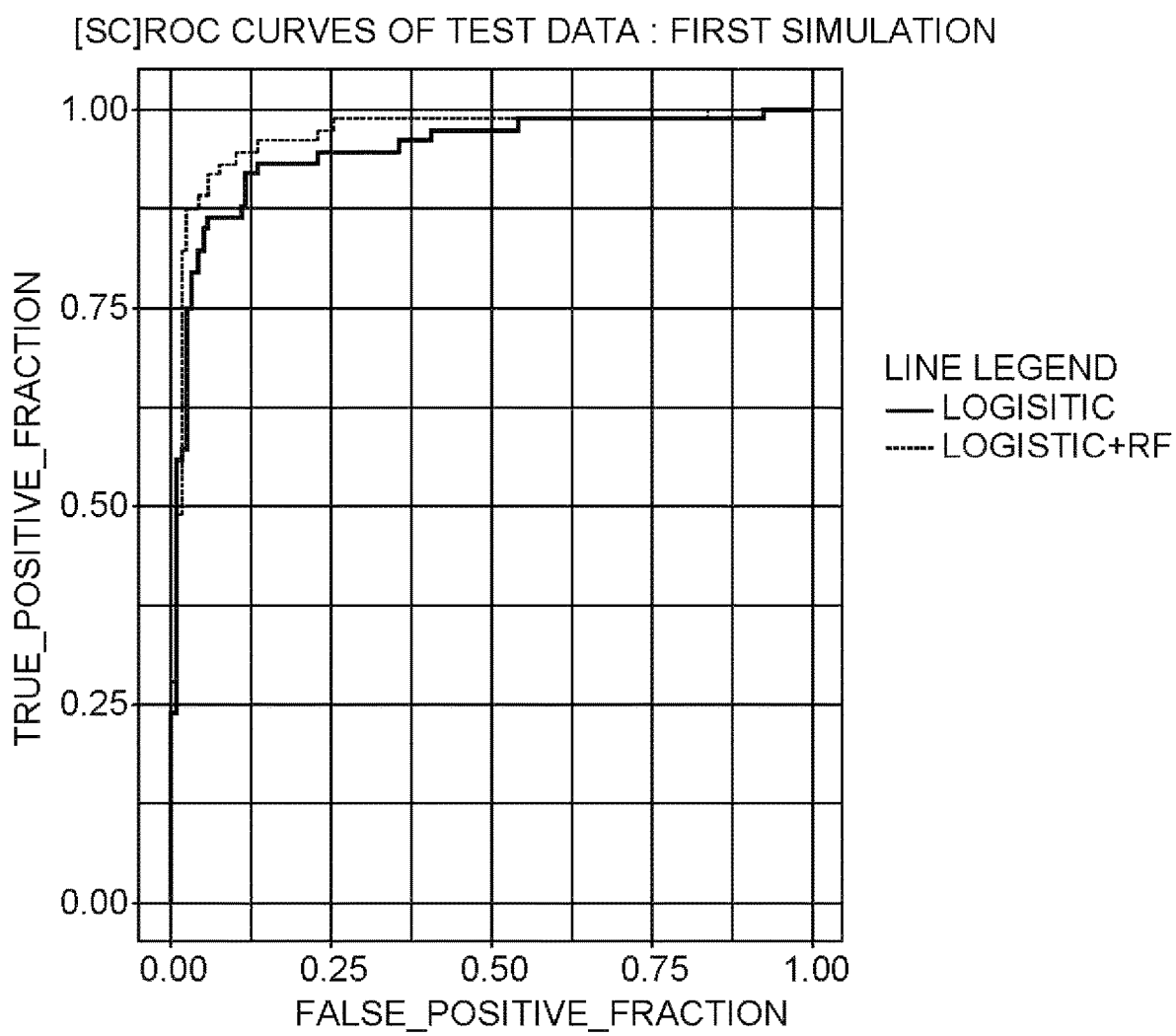
FIGS. 4A to 4D are drawings schematically illustrating the ROC curves used for evaluating performance of the conventional logistic regression model and that of the model in the present disclosure when classifying a stomach cancer patient and a non-patient.
Figure 4B:
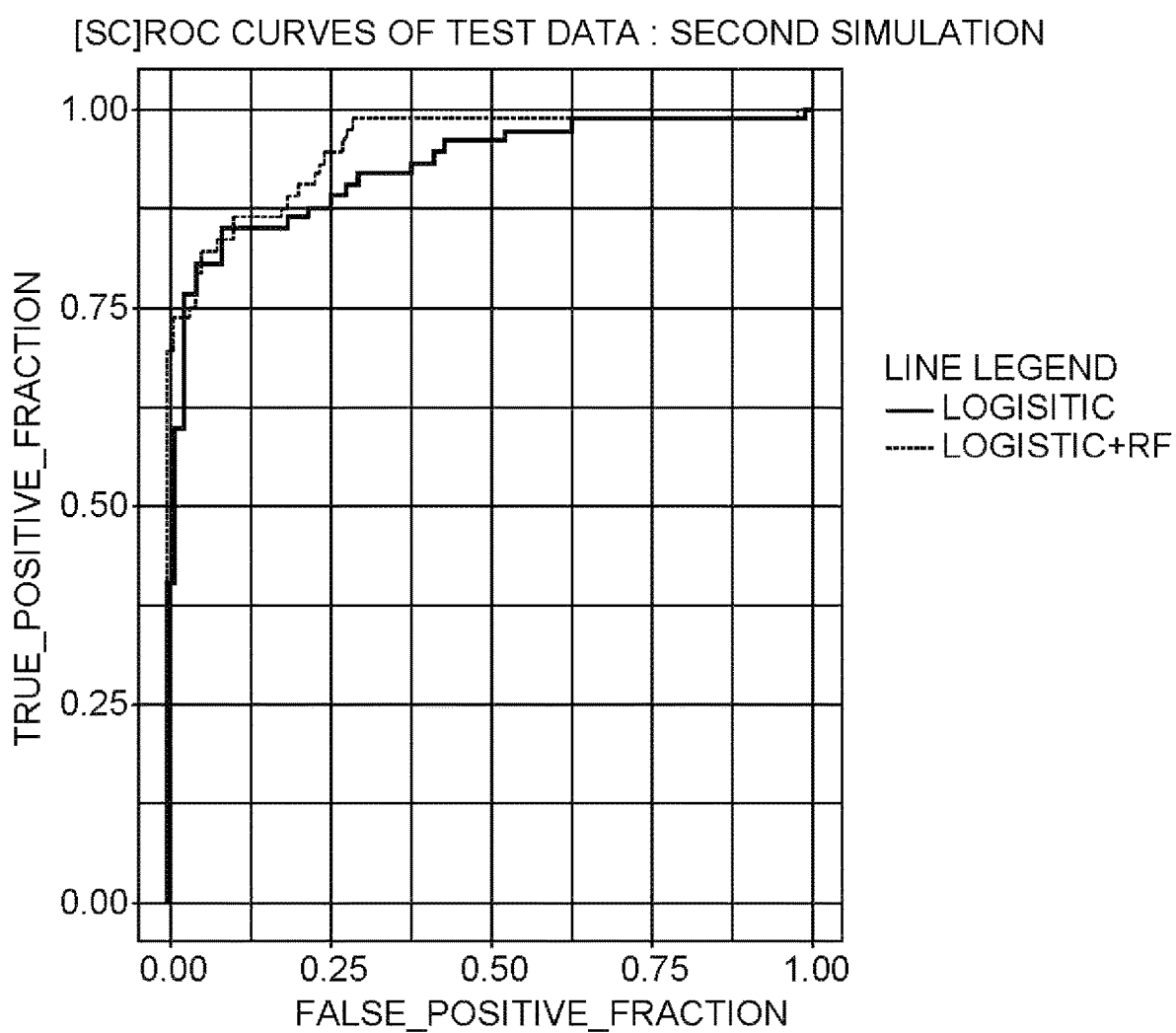
Figure 4C:
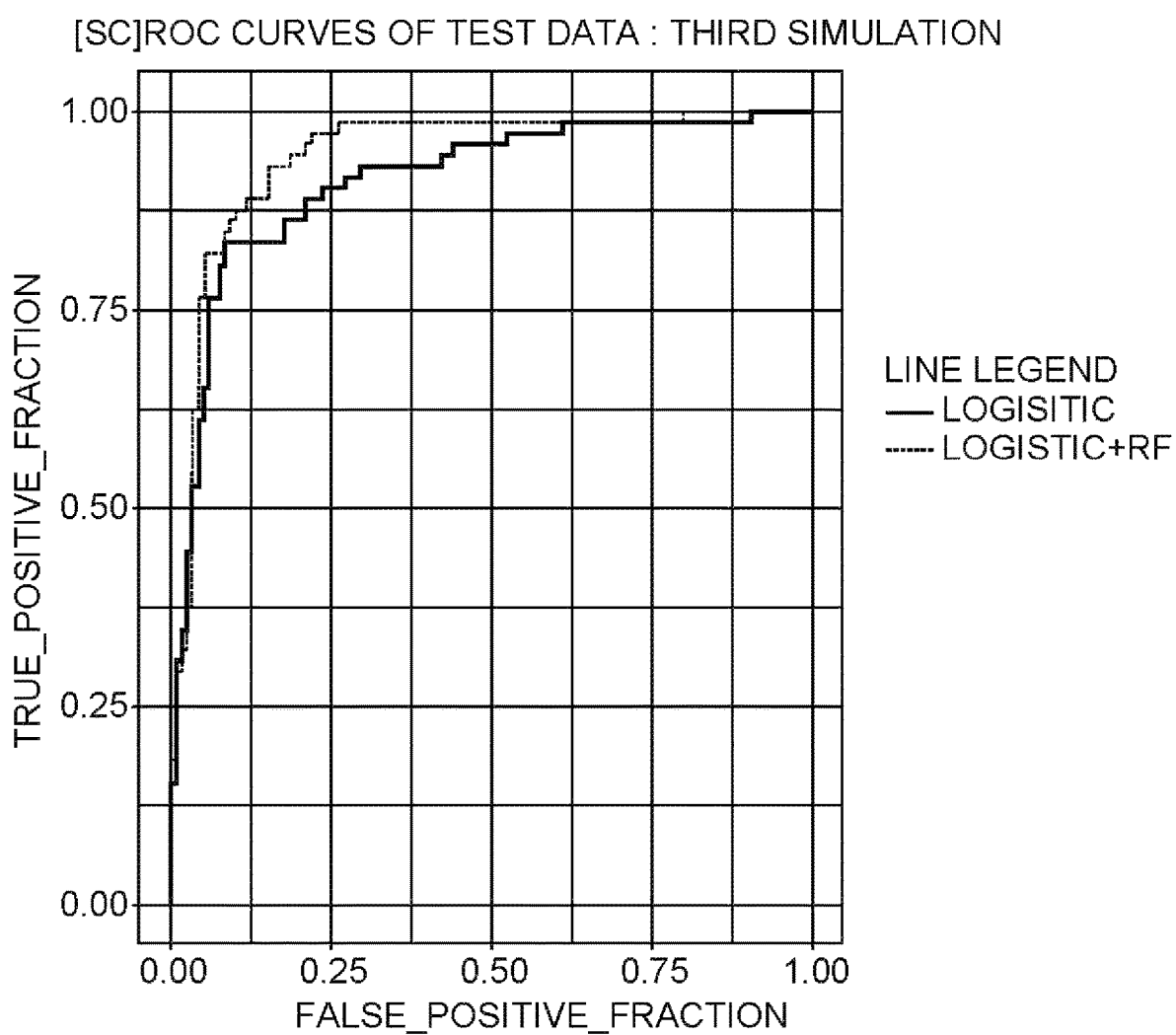
Figure 4D:
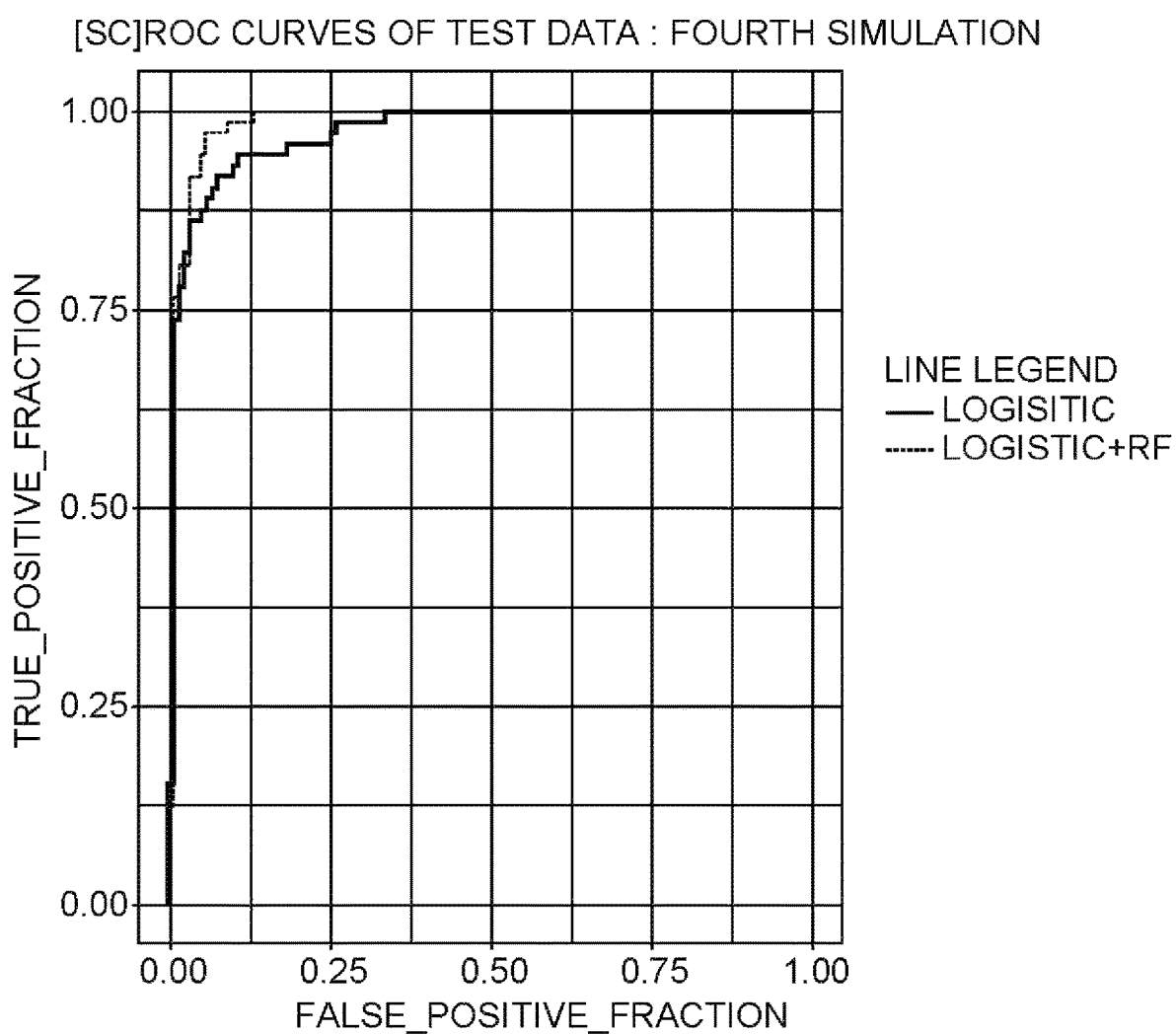

The method in accordance with the present disclosure is described as follows. FIG. 2 is a flow chart schematically illustrating an exemplary method for providing the two-class classification method to estimate the specific class of the specific item in accordance with the present disclosure.

By referring to FIG. 2, the present disclosure includes a step of S210 where the computing device 100 may acquire or support another device to acquire sample data $(Y_1, X_1), \ldots, (Y_n, X_n)$ which are independently and identically distributed. Herein n is the number of the sample data, $X_i = (1, X_{i1}, \ldots, X_{id})^T \in X \subset R^d$ is a d-dimensional vector, a dependent variable $Y_i$ has a value of −1 or 1. Herein, even in case that the dependent variable $Y_i$ does not have any of the values of −1 and 1, the dependent variable $Y_i$ may be easily manipulated to have one of the values.

A statistical model used in the present disclosure is semi parametric logistic regression with random forests. For convenience of explanation, this will be referred to as the model in the present disclosure. The model in the present disclosure is a novel methodology among methodologies for predicting dependent variables with only two classes, e.g., −1 and 1, using independent variables.

For easy understanding, Table 1 below shows examples X7 of the sample data which are concentrations of specific substances included in biological samples acquired from subjects, i.e., breast cancer patients and non-patients, and demographical information, e.g., age, of the subjects. Also, the substances X1 to X6 included in the biological samples in Table 1 may include AFP (Alpha-fetoprotein), TTR (Transthyretin), CEA (Carcinoembryonic ntigen), CA19-9 (Cancer antigen 19-9), CA125 (Cancer antigen 125), and ApoA1 (Apolipoprotein A-I).

TABLE 1

| Index Number | Dependent variable (Y) | Independent variable 1 (X1) | Independent variable 2 (X2) | Independent variable 3 (X3) | Independent variable 4 (X4) | Independent variable 5 (X5) | Independent variable 6 (X6) | Independent variable 7 (X7) |
|---|---|---|---|---|---|---|---|---|
| 1 | Cancer | 0.227887 | 6.09691 | 0.898583 | 1.578219 | 0.50515 | 5.464559 | 70 |
| 2 | Cancer | 0.553883 | 6.20412 | 1.234376 | 1.489356 | 0.583199 | 5.430452 | 40 |
| 3 | Cancer | 0.285557 | 6.09691 | 1.616439 | 0.850992 | 0.502427 | 5.162215 | 50 |
| 4 | Cancer | 0.292256 | 6.056905 | 1.320918 | 0.796635 | 0.120574 | 5.367977 | 55 |
| 5 | Cancer | 0.10721 | 6.08636 | 1.298449 | 1.511842 | 0.103804 | 5.361371 | 46 |
| ... | ... | ... | ... | ... | ... | ... | ... | ... |
| 230 | Normal | 0.450249 | 6.10721 | 1.749162 | 1.461187 | 0.488551 | 5.552668 | 54 |
| 231 | Normal | 0.507856 | 6.089905 | 1.349175 | 1.164168 | −0.08619 | 5.465383 | 47 |
| 232 | Normal | 0.661813 | 6.184691 | 1.078518 | 1.343647 | 0.519828 | 5.462398 | 47 |
| 233 | Normal | 0.40824 | 6.139879 | 0.971283 | 0.571325 | 0.222716 | 5.465383 | 61 |
| 234 | Normal | 0.910091 | 6.206826 | 0.726814 | 0.953703 | −0.1152 | 5.63749 | 71 |
| ... | ... | ... | ... | ... | ... | ... | ... | ... |

For reference, Table 2 shows examples of test data for performing tests using the model in the present disclosure generated by using the sample data.

TABLE 2

| Index Number | Estimation of values of the dependent variables | Independent variable 1 (X1) | Independent variable 2 (X2) | Independent variable 3 (X3) | Independent variable 4 (X4) | Independent variable 5 (X5) | Independent variable 6 (X6) | Independent variable 7 (X7) |
|---|---|---|---|---|---|---|---|---|
| 1 |   | 0.361728 | 6.041393 | 0.971283 | 0.571325 | −0.08725 | 5.347851 | 61 |
| 2 |   | 0.587711 | 5.972056 | 1.176894 | 0.883174 | 0.340444 | 5.148057 | 51 |
| 3 | ? | −0.10791 | 5.962226 | 1.095634 | 0.856273 | 0.123852 | 5.313121 | 58 |
| 4 | ? | 0.624282 | 6.161368 | 1.179364 | 0.571325 | 0.053078 | 5.364687 | 48 |
| 5 | ? | −0.07058 | 6.23393 | 1.088639 | 0.841011 | −0.17393 | 5.246845 | 40 |
| 6 | ? | −0.11351 | 6.086917 | 1.103201 | 0.850578 | 0.049218 | 5.233898 | 50 |
| ... | ... | ... | ... | ... | ... | ... | ... | ... |

For example, using the R statistical package, the step of S210 for acquiring the sample data may be performed by following commands, and as a result, the sample data may be inputted.

Code 11

```
Y = c(1, 1, ..., 0, 0, ...) # cancer patients coded as 1, non-patients
as 0. Because the function glm, i.e., the internal logistic
regression model of the R statistical package, only accepts 1 or
0 as its input.
X1 = c(0.227887, 0.553883, ..., 0.450249, 0.507856, ...)
X2 = c(6.09691, 6.20412, ..., 6.10721, 6.089905, ...)
...
```

If the sample data is acquired at the step of S210, then the method of the present disclosure may further include a step S220 of the computing device 100 estimating or supporting another device to estimate an unknown parameter β of the model equation $$G(x) = \mathbb{E}[\mathbb{P}(Y \mid X)] = \mathbb{P}(Y = 1 \mid X) = \frac{\exp\{2X^T\beta + 2g(X)\}}{1 + \exp\{2X^T\beta + 2g(X)\}},$$

$$\frac{1}{2}\log\frac{\mathbb{P}(Y = 1 \mid X)}{\mathbb{P}(Y = -1 \mid X)} = X^T\beta + g(X).$$

The rationale for the model in the present disclosure taking the form of the above model equation is as follows.

First, a Bayes classifier is defined as follows.

$$G(x) = \frac{1}{2}\log\frac{\mathbb{P}(Y = 1 \mid x)}{\mathbb{P}(Y = -1 \mid x)}$$

For example, suppose that P(Y=1|x)=0.6. Then, P(Y=−1|x)=1−P(Y=1|x)=0.4 and G(x)=log(0.6/0.4)/2=0.2027326. Because G(x) is larger than 0, it is classified as Y=1 by the Bayes classifier.

The model in the present disclosure may be expressed in the form of G(X) as follows. That is, the model combining the semi-parametric logistic regression with the random forests assumes the following.

<Equation 1>

$$\frac{1}{2}\log\frac{\mathbb{P}(Y = 1 \mid x)}{\mathbb{P}(Y = -1 \mid x)} = X^T\beta + g(X)$$

Herein, Y may be a dependent variable, and may only have values of −1 and 1, corresponding to two of the classes, in the equation. Also, $X = (1, X_1, \ldots, X_D)^T$ may be independent variables, and D may be the number of the independent variables. That is, $X_i$ may be an i-th independent variable.

$$\beta = (\beta_0, \beta_1, \ldots, \beta_d)$$

may be the unknown parameter, and the function g may be a function of X in the form of the random forest.

As one example, suppose that the G(X) is the Bayes classifier, $X = (1, 2, 3)^T$, $\beta = (4, 5, 6)^T$, and g(x)=7. That is, β and g are supposed to be given. Then, $G(x) = x^T\beta + g(x) = (1, 2, 3)(4, 5, 6)^T + 7 = 14 + 25 + 36 + 7 = 32 + 7 = 39$, and because G(x) is larger than 0, its result of the classification is Y=1.

To estimate the unknown parameter β and the function g in the equation 1, it may be the best to define β and g, that minimize a loss function L(y, G(x)) or $L_y(G(x))$, as estimated values. If the loss function is defined as negative binomial log likelihood, it may be expressed as $$L(y, G(x)) = \log(1 + \exp(-2yG(x)))$$

$$= \log[1 + \exp\{-2y(x^T\beta + g(x))\}], \ y \in \{-1, 1\}.$$

If $\hat{\beta}$ and $\hat{g}$ that minimize this loss function are defined then it may be expressed as $$\{\hat{\beta}, \hat{g}\} = \operatorname*{argmin}_{\{\beta, g\}} \sum_{i=1}^{N} L(y_i, x_i^T\beta + g(x_i)),$$

but this is hard to calculate directly.

Therefore, the present disclosure uses a backfitting method to estimate the unknown parameter β and the non-parameter g in the equation 1. The backfitting method is described as follows.

$$\hat{\beta} = \operatorname*{argmin}_{\beta} \sum_{i=1}^{N} L(y_i, x_i^T\beta),$$

-continued $$\hat{g} = \underset{g}{\operatorname{argmin}} \sum_{i=1}^{N} L(y_i, x_i^T \hat{\beta} + g(x_i))$$

A first equation of above will be solved at the step of S220, which is a first step, and a second equation will be solved at a step of S230, which is a second step.

At the step of S220, the logistic regression approach is used to estimate the unknown parameter $\beta$ and at the step of S230, with the estimated $\hat{\beta}$, a negative gradient, i.e., a negative of a slope, is used to estimate the unknown non-parameter g.

The logistic regression approach to estimate the unknown parameter $\beta$ from the equation 1 is described as follows. At this step of S220, $\beta$ may be estimated by using the logistic regression from $$\hat{\beta} = \underset{\beta}{\operatorname{argmin}} \sum_{i=1}^{N} L(y_i, x_i^T \beta)$$

$$= \underset{\beta}{\operatorname{argmin}} \sum_{i=1}^{N} \log[1 + \exp(-2y_i x_i^T \beta)].$$

The logistic regression is briefly described as follows. The equation 2 below represents the logistic regression model.

$$\frac{1}{2}\log\frac{P(Y=1\mid X)}{P(Y=-1\mid X)} = \frac{1}{2}x^T\beta^{glm} = x^T\left(\frac{1}{2}\beta^{glm}\right) \quad \text{<Equation 2>}$$

As can be seen from the form, $\frac{1}{2}\beta^{glm}$ in the logistic regression model functions similar to $\beta$ in the model in the present disclosure. The logistic regression also estimates the unknown parameter $\beta^{glm}$ which minimizes the same loss function. Therefore, $\frac{1}{2}\beta^{glm}$, i.e., a $\beta$ estimation value, may be derived by dividing $\beta^{glm}$, estimated by using the logistic regression, by 2. The $\beta$ derived as such may be referred to $\hat{\beta}$.

As a result, if an estimator of the logistic regression is $\hat{\beta}^{glm}$, then $\hat{\beta}$ is related to $\hat{\beta}^{glm}$ by $\hat{\beta}=\frac{1}{2}\hat{\beta}^{glm}$.

Using the R statistical package, $\hat{\beta}^{glm}$ may be calculated, e.g., by the following commands.

---
Code 12
---
Using glm, $\hat{\beta}^{glm}$, i.e., glmbeta is calculated.
glmbeta = glm(Y~X1+X2+X3+X4+X5+X6+X7,
family=binomial)$coefficients
$\hat{\beta}$, i.e., beta is calculated by dividing glm by 2.
beta = glmbeta/2
---

For example, the following $\hat{\beta}$ values may be confirmed if $\hat{\beta}$ is calculated by using the sample data in Table 1.

---
Code 13
---

| >beta | | | | | | | |
|---|---|---|---|---|---|---|---|
| (Intercept) | X1 | X2 | X3 | X4 | X5 | X6 | X7 |
| 62.40684649 | −2.00244054 | −3.29727188 | ... | ... | ... | ... | ... |

That is, $\hat{\beta}=(62.40686469, -2.00244054, -3.29727188, \ldots)^T$.

By referring to FIG. 2 again, the method of the present disclosure may further include the step 230 of the computing device 100, if an estimator $\hat{\beta}$ of the unknown parameter $\beta$ is acquired, estimating or supporting another device to estimate the function g by using the random forest model. Then, the computing device 100 of the method of the present disclosure may estimate or support another device to estimate a function G as an estimating equation for new data corresponding to the specific item by using the estimator $\hat{\beta}$ of the unknown parameter Q and the estimator $\hat{g}$ of the function g, to thereby acquire an estimator $\hat{G}$ of the function G at a step of S240.

At the step 230 of estimating or supporting another device to estimate the function g, a negative slope may be used in particular.

Because $\hat{\beta}$ is acquired at the step of S220, if $x^T\beta+g(x)$ is put into the loss function G(x) then the loss function becomes $L(y,G(x))=\log[1+\exp\{-2y(x^T\hat{\beta}+g(x))\}]$, $y\in\{-1,1\}$. At the step of S220, the loss function is minimized with $G(x)=x^T\hat{\beta}$. To reduce the loss function further, G(x) is translated at $x^T\hat{\beta}$ by the amount of the negative slope.

The negative slope of the loss function at $G(x)=x^T\hat{\beta}$ is as follows.

$$r_i = -\left[\frac{\partial L_{y_i}(G(x_i))}{\partial G(x_i)}\right]_{G(x_i)=x_i^T\hat{\beta}}$$

$$= -\left[\frac{\partial \log\{1 + \exp(-2y_i G(x_i))\}}{\partial G(x_i)}\right]_{G(x_i)=x_i^T\hat{\beta}}$$

$$= \frac{2y_i \cdot \exp\left(-2y_i \cdot x_i^T \hat{\beta}\right)}{1 + \exp\left(-2y_i \cdot x_i^T \hat{\beta}\right)}$$

$$= \frac{2y_i}{1 + \exp\left(2y_i \cdot x_i^T \hat{\beta}\right)}, i = 1, \ldots \ldots, n$$

The following example briefly shows how the loss function is reduced when translated by the amount of the negative slope. In the first data of the training data in Table 1 above, $y_1$ is 1, $x_1^T\hat{\beta}$ is −0.405374, and $r_1$ is 1.199956. If $G(x)=x^T\hat{\beta}$, $L(y,x_1^T\hat{\beta})=\log[1+\exp\{-2\cdot1\cdot(-0.405374+1)\}]=1.178529$. But if translated from $G(x)=x^T\hat{\beta}$ to $G(x)=x^T\hat{\beta}+r_1$ by the amount of the negative slope, then $L(y,x_1^T\hat{\beta}+r_1)=\log[1+\exp\{-2\cdot1\cdot(-0.405374+1*1.199956)\}]=0.1857292$ which is smaller.

Then, g may be estimated by acquiring RF(X) by fitting data $\{(r_i,x_i)\}_{i=1}^n$ to the random forest.

That is, the step S230 may include a step S232 of the computing device 100 calculating $$r_i = \frac{2y_i \cdot \exp\left(-2y_i \cdot x_i^T \hat{\beta}\right)}{1 + \exp\left(-2y_i \cdot x_i^T \hat{\beta}\right)}, i = 1, \ldots \ldots, n$$

and a step S234 of the computing device 100 calculating the function RF(X) which is a result of fitting the data $\{(r_i, x_i)\}_{i=1}^n$ using the random forest, to thereby estimate or support another device to estimate the function g by using $g(x) = \lambda \cdot RF(x)$ with the tuning parameter $\lambda = \gamma$.

In case the tuning parameter is not taken into consideration, i.e., $\lambda = \gamma = 1$, an example of calculating $r_i$ using the exemplary sample data in Table 1 is shown in Table 3.

TABLE 3

| Index Number | Dependent variable (Y) | Independent variable 1 (X1) | Independent variable 2 (X2) | Independent variable 3 (X3) | Independent variable 4 (X4) | Independent variable 5 (X5) | Independent variable 6 (X6) | Independent variable 7 (X7) |
|---|---|---|---|---|---|---|---|---|
| 1 | Cancer | 0.227887 | 6.09691 | 0.898583 | 1.578219 | 0.50515 | 5.464559 | 70 |

To calculate $r_i$ for the first (i=1) sample data in Table 1, suppose that if Y=cancer then y=1 and that if Y=normal then y=−1 in the sample data. Then, $\hat{\beta}$ calculated at the step of S220 is $(62.40686469, -2.00244054, -3.29727188, \ldots)^T$. Because the first sample is of a cancer patient, $y_1=1$.

$x_1^T\hat{\beta} = (1, 0.227887, 6.09691, \ldots) \cdot (62.40686469, -2.00244054, -3.29727188, \ldots)^T = 1*62.40686469 + 0.2278878*(-2.00244054) + 6.09691*(-3.29727188) + \ldots = -0.202687$ and $\exp(-2*y_1*x_1^T\hat{\beta}) = \exp(-2*1*-0.202687) = 1.499863$; $r_1 = 2*y_1*\exp(-2*y_1*x_1^T\hat{\beta})/\{1+\exp(-2*y_1*x_1^T\hat{\beta})\} = 2*1*1.499863/(1+1.499863) = 1.199956$ In a similar manner, $r_i$ for every sample data of the exemplar sample data is calculated.

Using the R statistical package, each of such steps may be performed by, e.g., the following commands.

Code 14

```
# code (inputting the sample data)
Y = c(1, 1, ..., -1, -1, ...) # cancer patients coded as 1,
non-patients as -1
X1 = c(0.227887, 0.553883, ..., 0.450249, 0.507856, ...)
X2 = c(6.09691, 6.20412, ..., 6.10721, 6.089905, ...)
...
# code (inputting β̂ , r_i)
beta = (62.40686469, -2.00244054, -3.29727188 , ...) # β̂
calculated by the logistic regression
r = c(1.199956, 1.239565, ...) # inputting r_i calculated
above
# code (calculating RF)
RF = randomForest(x=cbind(X1, X2, ... , X7), y=r)
# for reference, the last line of the code calculates the
function RF(X) by fitting the data {(r_i,x_i)}_{i=1}^n to the random
forest. "y=r" means that a responsive variable y is "r",
and "x=cbind(X1, X2, ... , X7)" means that an explanatory
variable x is "cbind(X1, X2, ... , X7)". Herein, cbind
means "combine by columns". That is, each of X1, X2, ...,
X7 is "cbind"ed into x.
```

As a result, for example, Y value of the first data of test data in Table 2 above may be estimated.

Code 15

```
x=(1, 0.361728, 6.041393, 0.971283, ...)
beta = (62.40686469, -2.00244054, -3.29727188 , ... )
# code (calculating RF)
rf = predict(RF, newdata= c(0.361728, 6.041393, 0.971283, ... ) )
# if RF is executed, RF(X) will have values shown as below.
> rf
       1
-0.0345803
x^T β̂ + RF(x)=(1, 0.361728, 6.041393, 0.971283, ...)*(62.40686469,
    -2.00244054, -3.29727188, ...)^T+ (-0.0345803)
= [1*62.40686469+0.361728* (-2.00244054) +6.041393* (-
3.29727188) +...] + (-0.0345803)
= 0.5805196 + -0.0345803 = 0.5459393
Because 0.5459393 is larger than 0, Y=1, i.e., it is classified
as a cancer patient.
A similar method is applied to the rest of the test data.
```

However, there is disadvantage that the random forest without the tuning parameter cannot minimize the loss function. Therefore, RF(X) may be minimized using the tuning parameter $\lambda$, and the reason that the loss function is not optimal when the tuning parameter is 1 is briefly explained as follows.

Taking an example of the first data of the training data in Table 1, $y_1$ is 1, $x_1^T\hat{\beta}$ is −0.405374, and $r_1$ is 1.199956. With the tuning parameter as 1 and the translation by the amount of the negative slope (i.e., $G(x_1) = x_1^T\hat{\beta} + r_1$), then $L(y, x_1^T\hat{\beta} + r_1) = \log[1 + \exp\{-2*1*(-0.405374 + 1*1.199956)\}] = 0.1857292$. But if the tuning parameter is 2 (i.e., $G(x_1) = x_1^T\hat{\beta} + 2*r_1$), then $L(y, G(x_1))$ becomes smaller as $\log[1 + \exp\{-2*1*(-0.405374 + 2*1.199956)\}] = 0.01834747$. That is, the loss function can be minimized when the tuning parameter is a number other than 1.

One of methods for estimating the tuning parameter $\lambda$ is a first method described below.

In the first method, the equation 1 may be expressed as $$\log \frac{P(Y=1 \mid x)}{P(Y=-1 \mid x)} = 2x^T\hat{\beta} + \lambda \cdot 2RF(x).$$

This is in a same form of the logistic regression model without intercept. The logistic regression model without intercept is as follows. Also, a single independent variable a is assumed for convenience. Then, $$\log \frac{P(Y=1 \mid x)}{P(Y=-1 \mid x)} = x^T = a \cdot \lambda.$$

Herein, Y is a dependent variable, and Y is either −1 or 1, i.e., two of the classes, in the equation. Also, a is a value of the independent variable. And $\lambda$ is an unknown parameter. And if an intercept b of the logistic regression without intercept is assumed to be given, the equation 1 may take the form below.

$$\log \frac{P(Y=1 \mid x)}{P(Y=-1 \mid x)} = b + a \cdot \lambda$$

Herein, b is a given intercept. Therefore, the equation below may be considered as the logistic regression without intercept.

$$\log \frac{P(Y=1 \mid x)}{P(Y=-1 \mid x)} = 2x^T \hat{\beta} + \lambda \cdot 2RF(x)$$

That is, Y may be considered as a dependent variable, 2RF as the independent variable a, $2x^T\hat{\beta}$ as the given intercept b, and $\lambda$ as the unknown parameter. Then $\lambda$ may be derived by the logistic regression, and $\lambda$ derived as such may be referred to as $\hat{\lambda}$.

Using the R statistical package, $2x_1^T\hat{\beta}$ and $2RF(x_1)$ may be calculated, e.g., by the following commands, for the first data of the sample data in Table 1.

---

Code 16

---

$\hat{\beta}$ calculated before is $\hat{\beta}$ =(62.40686469, −2.00244054, −3.29727188, ...)$^T$.

$2x_1^T\hat{\beta}$ = 2*[(1, 0.227887, 0.898583, ...) * (62.40686469, −2.00244054, −3.29727188, ...)$^T$]

= 2*[1*62.40686469 + 0.227887* (−2.00244054) + 0.898583* (−3.29727188) + ...]

= 2* [−0.202687]

= −0.405374

In a similar manner, for every data of the sample data in

Table 1, $2x_i^T\hat{\beta}$ is calculated.

$2x_2^T\hat{\beta}$= −0.4886246

...

code (calculating $\hat{\lambda}$)

explanatory = 2*RF$predict #RF is the RF calculated before.

If RF$predict is executed then RF(x) is calculated.

> explanatory

| 1 | 2 | 3 | 4 | 5 | 6 |
|---|---|---|---|---|---|
| −0.478491820 | −0.023113639 | 0.269053546 | −0.051978293 | −0.410774817 | −0.536232491 |
| 7 | 8 | 9 | 10 | 11 | 12 |
| −0.072804370 | −1.183758862 | −0.340995589 | −0.456663627 | 0.023651360 | 0.278973375 |

Thus $2RF(x_1)$=−0.478491820, $2RF(x_2)$=−0.023113639, ....

code($y_i$ is inputted into Y, $2x_i^T\hat{\beta}$ into prior, and $2RF(x_1)$ into explanatory)

Y = c(1, 1, ..., −1, −1, ...)

prior = c(−0.405374, −0.4886246, ...)

explanatory = c(−0.478491820, −0.023113639, ...)

code (calculating $\hat{\lambda}$)

lambda = glm(Y~0+explanatory, family="binomial", offset=prior)$coefficients if lambda is executed then its result is as follows.

> lambda explanatory 1.652886

In summary, a final model in the present disclosure with the applied tuning parameter $\lambda$ may be $$\frac{1}{2} \log \frac{P(Y=1 \mid x)}{P(Y=-1 \mid x)} = X^T \hat{\beta} + \hat{\lambda} \cdot RF(x). \qquad 5$$

In case the tuning parameter is taken into consideration as such, an example of estimating the Y value of the first data of the exemplar test data in Table 2 is shown below as Table 4.

TABLE 4

| Index Number | Estimation of values of the dependent variables | Independent variable 1 (X1) | Independent variable 2 (X2) | Independent variable 3 (X3) | Independent variable 4 (X4) | Independent variable 5 (X5) | Independent variable 6 (X6) | Independent variable 7 (X7) |
|---|---|---|---|---|---|---|---|---|
| 1 | | 0.361728 | 6.041393 | 0.971283 | 0.571325 | −0.08725 | 5.347851 | 61 |

The values below are calculated by the processes above.
$x = (1, 0.361728, 6.041393, \ldots)^T$
$\hat{\beta} = (62.40686469, -2.00244054, -3.29727188, \ldots)^T$
$\hat{\lambda} = 1.652886$ Then, an exemplar RF(X) value may be calculated as below. RF(X)=−0.0345803

For example, using the R statistical package, the command for calculating the RF(X) may be as follows.

---
Code 17 rf = predict (RF, newdata= c(0.361728, 6.041393, ..., 61))
RF is the RF calculated at a stage 2.
If executed, the stored RF(x) is shown as below.
> rf
     1
−0.0345803
---

Then, in accordance with the model in the present disclosure considering the tuning parameter, $x^T\hat{\beta} + \lambda \cdot RF(x)$ is calculated as $x^T\hat{\beta} + \lambda \cdot RF(x) = (1, 0.361728, 6.041393, \ldots) \cdot (62.40686469, -2.00244054, -3.29727188, \ldots)^T + 1.652886 \cdot (-0.0345803) = [1 \cdot 62.40686469 + 0.361728 \cdot (-2.00244054) + 6.041393 \cdot (-3.29727188) + \ldots] + 1.652886 \cdot (-0.0345803) = 0.5805196 + -0.05715729 = 0.5233623$, and because 0.5233623 is larger than 0, Y=1, that is, it is classified as the cancer patient. A similar method may be applied to the rest of the test data.

By referring to FIG. 2 again, the method of the present disclosure may further include a step S250 of the computing device 100, if an estimator $\hat{G}$ of the function G corresponding to the model acquired by the processes above is acquired and the new data $X_{new}$ is inputted, calculating a value of $\hat{G}(X_{new})$ and classifying or supporting another device to classify a specific class of the specific item using the calculated value of the $\hat{G}(X_{new})$, thus classification using the trained classifier is performed as in the examples aforementioned.

Considering practical examples of the classification, the two of the classes in the present disclosure may be, e.g., a class corresponding to being a patient of a specific disease and a class corresponding to not being the patient of the specific disease. In this case, each of the sample data may be acquired from individual subjects, and each independent variable $X_{ij}$ of the sample data may be a physical quantity of a specific substance included in a biological sample acquired from an individual subject or a demographical variable of the individual subject. The specific diseases of the present disclosure actually used in the real world may be breast cancer (BC) and stomach cancer (SC).

The inventors of the present disclosure used two of real data sets on the breast cancer and the stomach cancer acquired by Bioinfra Inc., Republic of Korea to prove effectiveness of the present disclosure. The real data sets are summarized in Table 5, part of which is already provided in Tables 1 and 2 for ease of understanding of the present disclosure.

TABLE 5

| Data set | Number of inputs | Size | Size(Y = 1) | Size(Y = −1) |
|---|---|---|---|---|
| BC | 7 | 554 | 307 | 247 |
| SC | 7 | 951 | 359 | 592 |

In Table 5, BC is breast cancer and SC is stomach cancer. The sizes of the real data sets are 554 for the breast cancer and 951 for the stomach cancer. In the data set of the breast cancer, the number of breast cancer patients (Y=1) is 307, and the number of the non-patients (Y=−1) is 247, and in the data set of the stomach cancer, the number of stomach cancer patients (Y=1) is 359, and the number of the non-patients (Y=−1) is 592.

The inventors of the present disclosure randomly divided each of the real data sets into a training data set of 80% and a test data set of 20%. The comparison of performance is performed between the conventional logistic regression model and the model in the present disclosure, and compared values are empirical error rates, average values of means of negative binomial log likelihood, and average values of ROC-AUC (Area Under Curve) between measured values and estimated values of the test data set.

To explain the empirical error rates briefly, for example, if the estimated values of the dependent variables are (cancer, cancer, cancer, normal, cancer, cancer) and the measured values of the dependent variables are (cancer, cancer, cancer, cancer, cancer, cancer), then the empirical error rate is calculated as 1/6=0.1666667, and the lower the empirical error rate is, the better it is. For reference, the empirical error rate derived from the data in Table 2 for the model in the present disclosure is 0.1272727 and for the logistic regression model is 0.1636364.

Also, to explain the negative binomial log likelihood briefly, it is defined as $\log(1+\exp(-2yG(x)))$, $y \in \{-1,1\}$, and herein $G(x)$ may be a Bayesian classifier. The lower the average of the negative binomial log likelihood, the better it is, which means the classification is closer to a reality. For reference, the average of the negative binomial log likelihood derived from the data in Table 2 for the model in the present disclosure is 0.2580402 and for the logistic regression model is 0.3367284.

And to explain the ROC-AUC briefly, the Receiver Operating Characteristic (ROC) curve is a tool for evaluating performance of the classifier, and the Area Under Curve (AUC) of the ROC is a ratio of an area under the curve to an area of a total plane of interest.

To explain the ROC curve briefly, an x axis of the ROC curve represents 1-specificity=a false positive rate, and the specificity is defined as true negative over (false positive+ true negative). That is, the specificity is a proportion of actual incorrectness (negatives) that are properly identified as such, thus the more the curve is inclined to the left, the smaller the rate of actual correctness (positives) improperly identified as wrong is. Also, a y axis of the ROC curve represents sensitivity=a true positive rate, and the sensitivity is defined as true positive over (true positive+false negative). That is, the sensitivity is a proportion of actual correctness that are properly identified as such, thus the more the curve is inclined to the top, the smaller the rate of actual incorrectness improperly identified as correct is. Therefore, the more correct the classifier decides, the larger the AUC is. If the classifier does not have a function of correct classification, the AUC is 0.5. In general, the classification may be performed according to the AUC, as uninformational if AUC=0.5, less accurate if 0.5<AUC≤0.7, somewhat accurate if 0.7<AUC≤0.9, very accurate if 0.9<AUC<1, and perfectly accurate if AUC=1. That is, the larger the AUC of the ROC, the better. For reference, the AUC derived from the data in Table 2 for the model in the present disclosure is 0.9663978 and for the logistic regression model is 0.9301075.

The data in Table 2 mentioned above is part of the whole test data set, and values derived from the whole test data set summarized in Table 5 are described as follows.

Table 6 below shows the average values of the empirical error rates derived from the test data set, and its standard deviations are shown in parentheses. In Table 6, the comparison of performance is performed by the values for the conventional logistic regression and the semi parametric logistic regression with random forests of the present disclosure. Herein, the number of iterations of calculation for acquiring the average values and the standard deviations is 1,000.

TABLE 6

| Data set | logistic regression | semi parametric logistic + RF |
| --- | --- | --- |
| BC | 0.1822545(0.03315503) | 0.1377091(0.02968256) |
| SC | 0.1122895(0.01886945) | 0.09069474(0.01840933) |

By referring to Table 6, the method of the present disclosure shows the lower empirical error rates compared to those of the conventional logistic regression. The method of the present disclosure is significantly better even when the deviations are taken into consideration.

Also, Table 7 below shows the average values of the means of negative binomial log likelihood derived from the test data set, and its standard deviations are shown in parentheses, as in Table 6. Also, the number of iterations of calculation for acquiring the average values and the standard deviations is 1,000.

TABLE 7

| Data set | logistic regression | semi parametric logistic + RF |
| --- | --- | --- |
| BC | 0.3851621(0.05138304) | 0.3167532(0.04919694) |
| SC | 0.3032058(0.04085424) | 0.251254(0.04079957) |

By referring to Table 7, the means of negative binomial log likelihood of the present disclosure, compared to those of the conventional logistic regression, are lower. This means fitting by the method in accordance with the present disclosure shows the classification closer to the reality than those of the conventional logistic regression.

Also, Table 8 below shows, in the similar way, the average values of the ROC-AUC derived from the same test data set, and its standard deviations are shown in parentheses. Also, the number of iterations of calculation for acquiring the average values and the standard deviations is 1,000.

TABLE 8

| Data set | logistic regression | semi parametric logistic + RF |
| --- | --- | --- |
| BC | 0.9074627(0.02485286) | 0.9396223(0.01987292) |
| SC | 0.9403305(0.01544577) | 0.9588379(0.01310146) |

For reference, FIGS. 3A to 3D are drawings schematically illustrating the ROC curves used for evaluating performance of the conventional logistic regression model and that of the model in the present disclosure when classifying a breast cancer patient and a non-patient, and FIGS. 4A to 4D are drawings schematically illustrating the ROC curves used for evaluating performance of the conventional logistic regression model and that of the model in the present disclosure when classifying a stomach cancer patient and a non-patient.

FIGS. 3A to 3D, and FIGS. 4A to 4D respectively illustrate the ROC curves for each of the methods for four of initial calculations with regard to the test data set.

By referring to FIGS. 3A to 3D, and FIGS. 4A to 4D, those skilled in the art can see that the method of the present disclosure is significantly better than the conventional logistic regression in distinguishing the breast cancer patients or the stomach cancer patients from the non-patients.

By referring to Table 7 showing a numerically equivalent conclusion, the method of the present disclosure shows higher averages of AUC than the conventional logistic regression. This means that the classification performance of the method of the present disclosure is better.

Throughout all example embodiments aforementioned of the present disclosure, the method of the present disclosure has an effect of more accurate classification of the specific class of the specific item corresponding to the input data, compared to the conventional methods.

Advantage of techniques of the present disclosure as explained using the above example embodiments is that accuracy of the classification can be improved without substantial increase of computation. Also, development of a general model capable of general two-class classification by improving the logistic regression model commonly used for two-class classification is a remarkable achievement.

The present disclosure has an effect of providing an accurate two-class classification method despite required computational load.

Based on the explanation of the above embodiment, those skilled in the art can clearly understand that the present disclosure can be implemented by combination of software and hardware or hardware alone. The part contributing to the prior art or the object of a technical solution of the present disclosure may be implemented in a form of executable program command through a variety of computer components and recorded to computer readable media. The computer readable media may include solely or in combination, program commands, data files, and data structures. The program commands recorded in the media may be components specially designed for the present disclosure or may be known and usable to those skilled in the art in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which may be executed by a computer. The aforementioned hardware device can work as more than a software module to perform the action of the present disclosure and vice versa. The hardware device may include a processor such as a CPU or a GPU, combined with a memory device such as ROM or RAM to store the program commands, configured to execute the commands stored in the memory, and a communication part which can exchange signals with external devices. In addition, the hardware device may include a keyboard, a mouse, and any other external input device to receive commands prepared by developers.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the spirit of the present disclosure must not be confined to the explained embodiments, and the following patent claims as well as everything including variations equal or equivalent to the patent claims pertain to the category of the spirit of the present disclosure.

The variations equal or equivalent to the patent claims may include, e.g., mathematically equivalent or logically equivalent methods capable of producing a same result of the methods in accordance with the present disclosure.

What is claimed is:

1. A computer-implemented method for acquiring an estimator $\hat{G}$ to be used for 2-class classification of a specific subject as a patient of a specific disease using a computing device, the method comprising steps of:

using the computing device, acquiring sample data $(Y_1, X_1), \ldots, (Y_n, X_n)$, which is independently and identically distributed, and which corresponds to concentrations of specific substances included in biological samples acquired from subjects, wherein n is the number of the sample data, $X_i=(1, X_{i1}, \ldots, X_{id})^T \in X \subset \mathbb{R}^d$ is a d-dimensional vector, $Y_i$ has a value of −1 or 1, and −1 and 1 are each set as respectively corresponding to one of two classes;

using the computing device, estimating an unknown parameter $\beta$ of a model equation $$G(x) = \mathbb{E}[\mathbb{P}(Y \mid X)] = \mathbb{P}(Y=1 \mid X) = \frac{\exp\{2X^T\beta + 2g(X)\}}{1+\exp\{2X^T\beta + 2g(X)\}},$$

and $$\frac{1}{2}\log\frac{\mathbb{P}(Y=1 \mid X)}{\mathbb{P}(Y=-1 \mid X)} = X^T\beta + g(X),$$

wherein $\beta=(\beta_0, \beta_1, \ldots, \beta_d)$, X is an independent variable, Y is a dependent variable, and the function g takes a form of a random forest model;

using the computing device, estimating the function g by using the random forest model; and using the computing device, estimating the function G as an estimating equation for new data corresponding to concentration of specific substances included in at least one biological sample acquired from the specific subject by using the estimator $\hat{\beta}$ of the unknown parameter $\beta$ and the estimator $\hat{g}$ of the function g, to thereby acquire an estimator $\hat{G}$ of the function G.

2. The method of claim 1, further comprising a step of:

using the computing device, with new data $X_{new}$ inputted, calculating a value of $\hat{G}(X_{new})$ and determining a specific class of the specific subject by referring to the value of the calculated $\hat{G}(X_{new})$.

3. The method of claim 1, wherein the estimator $\hat{\beta}$ of the unknown parameter $\beta$ is calculated by using $$\hat{\beta} = \operatorname*{argmin}_{\beta} \sum_{i=1}^{N} L(y_i, X_i^T\beta)$$

$$= \operatorname*{argmin}_{\beta} \sum_{i=1}^{N} \log\left[1+\exp\left(-2y_i X_i^T\beta\right)\right],$$

wherein $y_i$ is an actually measured Y value of i-th sample data, $X_i=(1, X_{i1}, \ldots, X_{iD})^T$ is an actually measured X value of the i-th sample data, $X_{ij}$ is a value of a j-th independent variable of the actually measured X value of the i-th sample data, and D is the number of independent variables including the j-th independent variable.

4. The method of claim 1, wherein the estimator $\hat{g}$ $$\hat{g} = \operatorname*{argmin}_{g} \sum_{i=1}^{N} L(y_i, X_i^T\hat{\beta} + g(X_i))$$

$$= \operatorname*{argmin}_{g} \sum_{i=1}^{N} \log\left[1+\exp\left\{-2y_i(X_i^T\hat{\beta} + g(X_i))\right\}\right]$$

of the function g is calculated by using a negative slope and a tuning parameter $\lambda \geq 0$), and wherein $y_i$ is an actually measured Y value of i-th sample data, $X_i=(1, X_{i1}, \ldots, X_{iD})^T$ is an actually measured X value of the i-th sample data, and $X_{ij}$ is a value of a j-th independent variable of the actually measured X value of the i-th sample data.

5. The method of claim 1, wherein estimating the function g includes steps of:
using the computing device, calculating $$r_i = \frac{2y_i \cdot \exp\left(-2y_i \cdot X_i^T \hat{\beta}\right)}{1 + \exp\left(-2y_i \cdot X_i^T \hat{\beta}\right)}, i = 1, \ldots \ldots, n$$

wherein $y_i$ is an actually measured Y value of i-th sample data,
$X_i = (1, X_{i1}, \ldots, X_{iD})^T$ is an actually measured X value of the i-th sample data,
$X_{ij}$ is a value of a j-th independent variable of the actually measured X value of the i-th sample data, and
D is the number of independent variables including the j-th independent variable; and
using the computing device, calculating a function RF(X) resulting from data $\{(r_i, X_i)\}_{i=1}^n$ fitted by the random forest model, and estimating the function g from $g(X) = \lambda RF(X)$ with respect to a tuning parameter $\lambda$.

6. The method of claim 4 or 5, wherein a value of the tuning parameter $\lambda$ is 1.

7. The method of claim 4 or 5, wherein the tuning parameter $\lambda$ is calculated by using a logistic regression model without intercept.

8. The method of claim 1, wherein
each independent variable $X_{ij}$ of the sample data is (i) a physical quantity of a specific material included in a biological sample acquired from an individual patient or (ii) at least one demographical variable of the individual patient.

9. The method of claim 1, wherein the specific disease is breast cancer or stomach cancer.

10. A computing device for 2-class classification of a specific subject as a patient of a specific disease, comprising:
a communication part for acquiring sample data $(Y_1, X_1), \ldots, (Y_n, X_n)$, which is independently and identically distributed, and which corresponds to concentrations of specific substances included in biological samples acquired from subjects, wherein n is the number of the sample data, $X_i = (1, X_{i1}, \ldots, X_{id})^T \in X \subset \mathbb{R}^d$ is a d-dimensional vector, $Y_i$ has or is manipulated to have a value of −1 or 1, and -1 and 1 are each set as respectively corresponding to one of two classes; and
a processor for: an unknown parameter $\beta$ of a model equation $$G(x) = \mathbb{E}[\mathbb{P}(Y \mid X)] = \mathbb{P}(Y = 1 \mid X) = \frac{\exp\{2X^T \beta + 2g(X)\}}{1 + \exp\{2X^T \beta + 2g(X)\}},$$

and $$\frac{1}{2} \log \frac{\mathbb{P}(Y = 1 \mid X)}{\mathbb{P}(Y = -1 \mid X)} = X^T \beta + g(X),$$

wherein $\beta = (\beta_0, \beta_1, \ldots, \beta_d)$, X is an independent variable, Y is a dependent variable, and the function g takes a form of a random forest model;
estimating the function g by using the random forest model; and
estimating the function G as an estimating equation for new data corresponding to concentration of specific substances included in at least one biological sample acquired from the specific subject by using the estimator $\hat{\beta}$ of the unknown parameter $\beta$ and the estimator $\hat{g}$ of the function g, to thereby acquire an estimator $\hat{G}$ of the function G.

11. The computing device of claim 10 with new data $X_{new}$ inputted, the processor further to calculate a value of $\hat{G}(X_{new})$ and determine a specific class of the specific subject by referring to the value of the calculated $\hat{G}(X_{new})$.

12. The computing device of claim 10, wherein the estimator $\hat{\beta}$ of the unknown parameter $\beta$ is calculated by using $$\hat{\beta} = \operatorname*{argmin}_{\beta} \sum_{i=1}^{N} L(y_i, X_i^T \beta)$$

$$= \operatorname*{argmin}_{\beta} \sum_{i=1}^{N} \log\left[1 + \exp\left(-2y_i X_i^T \beta\right)\right],$$

wherein $y_i$ is an actually measured Y value of i-th sample data,
$X_i = (1, X_{i1}, \ldots, X_{iD})^T$ is an actually measured X value of the i-th sample data,
$X_{ij}$ is a value of a j-th independent variable of the actually measured X value of the i-th sample data, and
D is the number of independent variables including the j-th independent variable.

13. The computing device of claim 10, wherein the estimator $\hat{g}$ $$\hat{g} = \operatorname*{argmin}_{g} \sum_{i=1}^{N} L(y_i, X_i^T \hat{\beta} + g(X_i))$$

$$= \operatorname*{argmin}_{g} \sum_{i=1}^{N} \log\left[1 + \exp\left\{-2y_i(X_i^T \hat{\beta} + g(X_i))\right\}\right]$$

of the function g is calculated by using a negative slope and a tuning parameter $\lambda \geq 0$, and
wherein $y_i$ is an actually measured Y value of i-th sample data,
$X_i = (1, X_{i1}, \ldots, X_{iD})^T$ is an actually measured X value of the i-th sample data, and
$X_{ij}$ is a value of a j-th independent variable of the actually measured X value of the i-th sample data.

14. The computing device of claim 10, wherein estimating the function g includes steps of:
calculating $$r_i = \frac{2y_i \cdot \exp\left(-2y_i \cdot X_i^T \hat{\beta}\right)}{1 + \exp\left(-2y_i \cdot X_i^T \hat{\beta}\right)}, i = 1, \ldots \ldots, n$$

wherein $y_i$ is an actually measured Y value of i-th sample data,
$X_i = (1, X_{i1}, \ldots, X_{iD})^T$ is an actually measured X value of the i-th sample data,
$X_{ij}$ is a value of a j-th independent variable of the actually measured X value of the i-th sample data, and
D is the number of independent variables including the j-th independent variable; and
calculating a function RF(X) resulting from data $\{(r_i, X_i)\}_{i=1}^n$ fitted by the random forest model, and estimating the function g from $g(X) = \lambda RF(X)$ with respect to a tuning parameter $\lambda$.

15. The computing device of claim 13 or 14, wherein a value of the tuning parameter $\lambda$ is 1.

16. The computing device of claim 13 or 14, wherein the tuning parameter $\lambda$ is calculated by using a logistic regression model without intercept.

17. The computing device of claim 10, wherein
each independent variable $X_{ij}$ of the sample data is (i) a physical quantity of a specific material included in a biological sample acquired from an individual patient or (ii) at least one demographical variable of the individual patient.

18. The computing device of claim 10, wherein the specific disease is breast cancer or stomach cancer.

* * * * *